April 6, 1926. 1,579,228
M. L. MARTUS ET AL
PRIMARY CELL AND ELEMENT THEREOF
Filed May 24, 1923   3 Sheets-Sheet 1
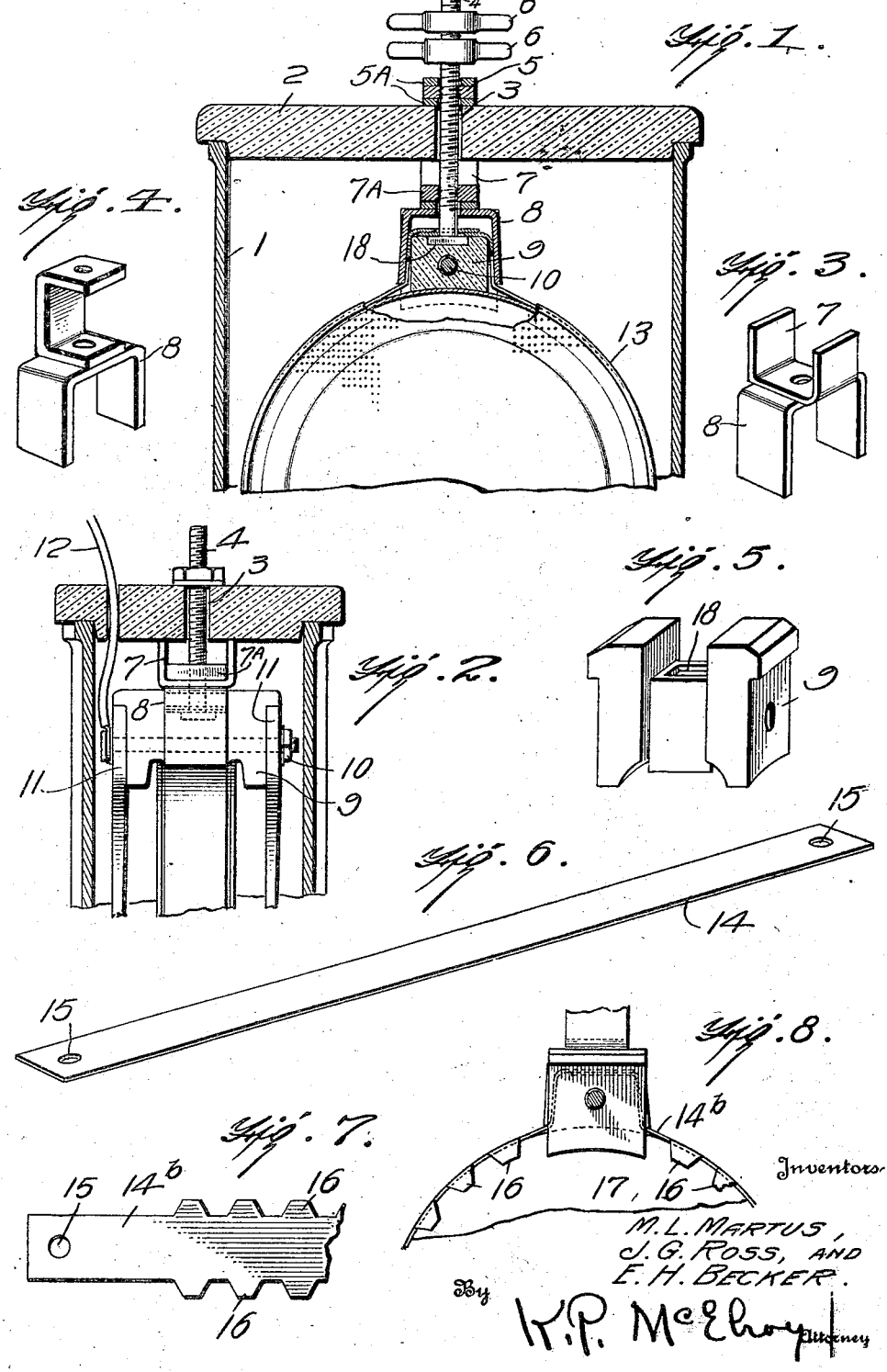

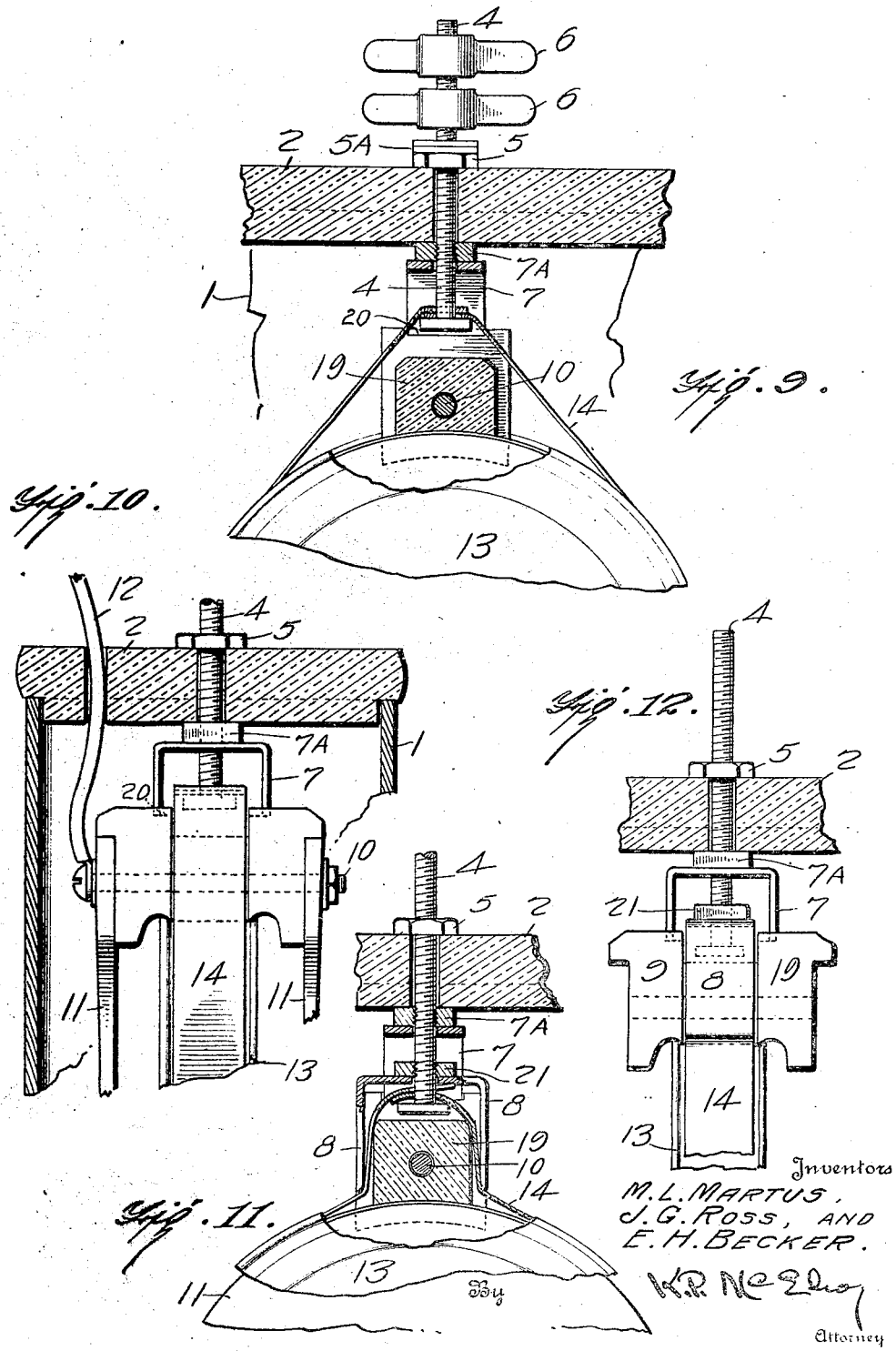

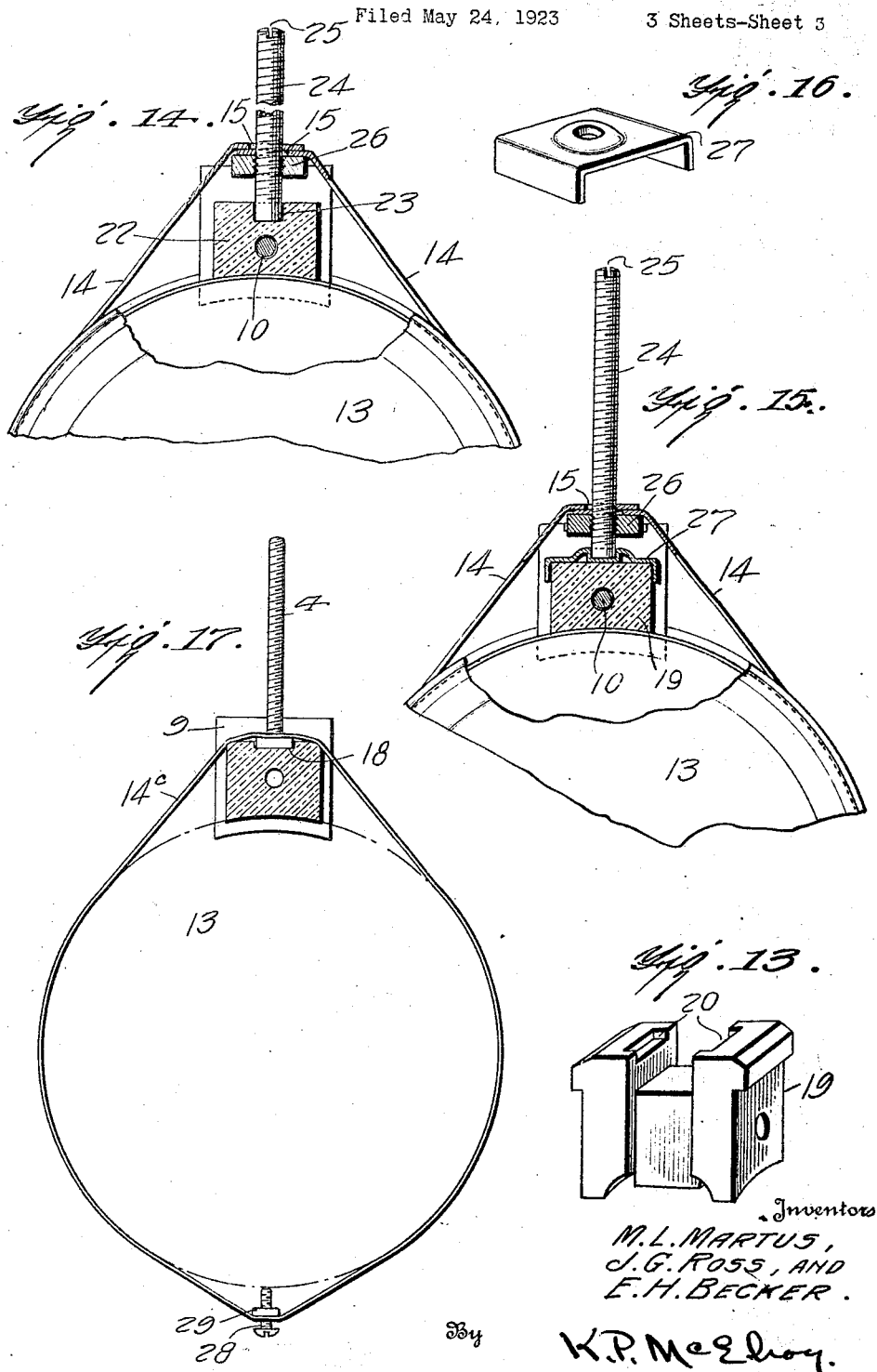

Patented Apr. 6, 1926.

1,579,228

UNITED STATES PATENT OFFICE.

MARTIN L. MARTUS, OF WOODBURY, AND JAMES G. ROSS AND EDMUND H. BECKER, OF WATERBURY, CONNECTICUT.

PRIMARY CELL AND ELEMENT THEREOF.

Application filed May 24, 1923. Serial No. 641,210.

*To all whom it may concern:*

Be it known that we, MARTIN L. MARTUS, JAMES G. ROSS, and EDMUND H. BECKER, all citizens of the United States, said MARTUS being a resident of Woodbury, in the county of Litchfield and State of Connecticut, and said Ross and said BECKER being residents of Waterbury, in the county of New Haven and State of Connecticut, have invented certain new and useful Improvements in Primary Cells and Elements Thereof, of which the following is a specification.

This invention relates to primary cells and elements thereof; and it comprises a heavy duty primary cell, advantageously of the type employing copper oxid as a depolarizer and an alkaline electrolyte, said cell having the active elements firmly clamped in place and rigidly held by the tightening of a single nut and said cell comprising a container, a top therefor, an insulating block holding element carried by the top, means for securing zinc plates or disks to said block, a flexible clasping band adapted to engage and hold a disk or short cylinder of depolarizer, and means for clamping the band to the block element; all as more fully hereinafter set forth and as claimed.

In the manufacture of heavy-duty primary cells for such purposes as switch circuits, radio work, shipboard wiring, etc., it is a desideratum to be able to provide a cell of simple structure in which the positive and negative elements are firmly and rigidly held in place and in which easy and quick assemblage and disassemblage, with exchange or renewal of such elements, is possible. After a cell has been used as long as may be deemed expedient, these elements still have some value. In cells of the zinc-copper oxid type, for example, the residues of the zinc plates can be remelted and the copper from the copper oxid can be reoxidized and used again. And it is desirable to have such a type of cell that the user can readily detach used elements and replace them by fresh, turning in the used elements against the cost of new. This is particularly the case in radio installations for receiving purposes and in large-scale installations on shipboard, railway signalling, etc.

In the present invention this desideratum is met by a particular structure of holding devices with means for clamping suspended elements in place on a block of insulating material depending below and held by the cover of a jar or other suitable container. We shall hereinafter describe it more particularly as applied to a cell of the zinc-copper oxid type, although the invention is by no means limited thereto. In this type of cell, sometimes the elements are cylindrical; and sometimes of flat shape. The flat shape has many convenient features; but it is difficult, with the structures now in use, to secure rigidity with ease of assemblage.

In the present invention, we provide a holding element of insulating material, generally of ceramic material or glass in cells with an alkaline electrolyte, such as the zinc-copper oxid type; this element being a block of more or less cubic form. Two faces are used to hold zinc plates; these plates being generally in the form of disks or short cylinders and the faces being usually recessed somewhat to accommodate and fit their tops. The plates are held in place by a transverse bolt; the block being perforated to accommodate the bolt. The bottom of the block is given an arcuate or curved contour to fit the top of the disk or short cylinder of depolarizing material forming the negative element. This element may be a body of copper oxid of suitable form; or it may be a can of perforated metal or wire gauze containing copper oxid (or other depolarizer). This can may be of tinned or galvanized metal. To hold this element in place a clasping band is used; this band being of thin sheet metal (which may also be tinned or galvanized iron) and being adapted to pass over the other two faces of the block and be there clamped in place. This structure results in holding the negative element in place between and parallel to a pair of zinc elements. Usually, said other two faces and the top of the block are slotted to accommodate the band and give accurate register with prevention of pivotal turning in assemblage.

The clasping band may be a continuous annulus or a strip of flexible metal of sufficient length to permit its being bent into an annulus with overlapping ends. In either event, it is provided with an orifice, or orifices, through which can be passed a headed, bolt-like element, serving to suspend the whole assemblage from the cover of the container, as a clamping means and as a current conductor from the negative element. Suitable spacing means are provided between the bottom of the cover and the top of the block and the bolt is provided with suitable lock nuts. By placing the clasping band around the negative element and the bolt through the orifice, or orifices, in the band and screwing the bolt upward, with the aid of the nuts, the negative element is forced against the arcuate bottom of the block and rigidly held in place. The adjustment of but one nut on the bolt is necessary in securing rigid assemblage.

In the accompanying drawings are shown, more or less diagrammatically, certain embodiments of the described invention, the same reference numerals in the different views indicating corresponding parts.

Fig. 1 is a fragmentary central vertical section through a primary cell, certain parts being shown in elevation;

Fig. 2 is a similar view at right angles to the view of Fig. 1;

Fig. 3 is a perspective view of yoke-like spacing and clamping elements;

Fig. 4 is another view of a modified spacing element;

Fig. 5 is a perspective view of an insulating block for holding the positive and negative elements;

Fig. 6 is a view of a clasping band in the flat;

Fig. 7 is a similar fragmentary view of a modified clasping band;

Fig. 8 is a fragmentary view showing the use of this modified clasping band;

Fig. 9 is a fragmentary central vertical section of a cell wherein such a clamping yoke as that of Figs. 3 and 4 is not used;

Fig. 10 is another view of the same structure at right angles to the view of Fig. 9;

Fig. 11 is a view similar to Fig. 1, showing another modification;

Fig. 12 is a view of a structure of Fig. 11 at right angles thereto;

Fig. 13 is a fragmentary perspective view of a modified block of an insulating material;

Fig. 14 is a fragmentary sectional view of a modified form of suspension;

Fig. 15 is a view similar to Fig. 14 showing a metallic shoe bearing for the bolt;

Fig. 16 is a perspective view of the shoe shown in Fig. 15; and

Fig. 17 is a fragmentary central vertical section showing a negative element and clasping band with clamping in a different way.

Referring first to Fig. 1, element 1 is a suitable container, usually a glass jar, surmounted by a cover 2 of porcelain, glass, hard rubber or other insulating material. Porcelain or other ceramic material is usually employed. As shown, this top is provided with a central orifice 3 through which passes a metal bolt-like holding element 4 which also forms one electric terminal. Above the cover this bolt element is provided with washers 5ᴀ, lock nut 5 and wing nuts 6; below the cover and encircling the bolt is a square nut 7ᴀ and a spacing element 7 abutting against the cover. Below this element 7 and also held on the bolt 4 is clamping yoke 8. Within the yoke is located a holding element 9 formed by a block of porcelain or other suitable insulating material (see Fig. 5). Passing through this block is a metal bolt 10 (see Fig. 2) which can be utilized to hold two zinc plates 11 in place; the porcelain being suitably recessed (as shown in Fig. 5) to receive their tops and give accurate placement thereto. Connected to this bolt 10 is an insulated terminal wire 12 passing through a lateral orifice in the top or cover. The negative electrode may take the form of a solid disk of agglomerated copper oxid or other depolarizing agent or such depolarizing agent may be contained in a round can-like element of perforated metal or wire netting; shown rather diagrammatically at 13 in Fig. 1. The bottom of the block 9 is made arcuate to fit and give positive engagement with the top of this disk-like negative element. Encircling and clasping the negative element is a holding band 14, shown in the flat in Fig. 6. At the ends this band is provided with perforations 15 adapted to receive the holding bolt element 4. Where the negative electrode is a block or disk of agglomerated copper oxid or other depolarizing agent, as it may be, we use the type of band shown as 14ᵇ in Fig. 7; this band being provided with bendable lateral lugs or flanges 16. As shown in Fig. 8, these lugs may be bent around to engage a block of copper oxid 17. Using a perforated canister with ridged edges to hold the depolarizing element, as shown in Fig. 1, the simple straight metal strip shown in the flat in Fig. 6 is sufficient.

In assembling the cell, or in renewing the zincs or the negative electrode, as the case may be, the band 14 or 14ᵇ may be bent around the disk-like negative electrode with bolt element 4 passing through perforations 15. The porcelain block 9 is then slipped into place, and yoke 8, spacer 7 and nut 7ᴀ placed on the bolt 4. By suitably manipulating nut 7ᴀ, yoke 8 is forced downward on bolt 4. The yoke forms a clamping engagement with band 14 or 14ᵇ, as the case may be, holding it securely in place. The zinc elements are placed in position before or after doing this, by means of bolt 10. Bolt 4 is then passed through the orifice in the cover and washers 5ᴀ, nut 5 and wing nuts 6 are applied.

As will be seen from the drawing and description, in this cell the zinc elements and the depolarizing elements are firmly and rigidly held, being secure against displacement and vibration, while nevertheless either can be readily removed and replaced by the use of simple tools.

In using primary cells in battery for switch circuits, radio work, etc., it is customary to use a number of such cells in battery; the cells being placed in fixed relation to each other. From time to time it becomes necessary to replace the zincs and the depolarizing elements and it is desirable to be able to do this without disturbing the battery arrangement. This is readily possible under the present invention. For example, a number of these cells can be used to furnish energy in a radio outfit (as the A, the B or the C battery, as the case may be), and as the activity of any particular cell diminishes, new active elements can be readily inserted without disturbance of the battery as a whole. It is a simple matter of removing the top of a particular cell together with the depending active elements. If the zincs are to be renewed, this is readily accomplished by removing the bolt 10. If the negative electrode is to be changed, on loosening nut 7A the clamping engagement on band 14 is loosened and a new negative electrode can be slipped into place.

In the modifications shown in Figs. 9, 10, 11 and 12, the porcelain block 19 differs from that of Fig. 5 in being provided with recesses 20 (see Fig. 13). In assembling the cell shown in Fig. 9, the band 14 or 14ᵇ may be bent around the disk-like negative electrode with the bolt element 4 passing through perforations 15. The porcelain block 19 is then slipped into place, and spacer 7 (inverted with respect to its position shown in Fig. 1) and clamping nut 7A are placed on the bolt 4. The downwardly depending arms of the spacer 7 are positioned in the recesses 20 which prevent rotation of the spacer. The clamping nut is then suitably manipulated to pull the bolt 4 upwardly within the spacer, thereby tightening the band 14 and pushing block 19 against negative electrode 13 and serving to hold the electrode firmly in place. The zinc elements may be placed in position and the entire assemblage positioned on the battery cover 2, all as previously described.

In the modification shown in Figs. 11 and 12, the assembly shown in Fig. 9 is changed by the addition of the clamping yoke 8 (see Fig. 1), which is forced down on the bolt by means of the nut 21 (similar to nut 7A, Fig. 1), thereby drawing in the band 14 and firmly securing the negative electrode 13 to the block 19. In the manufacture of the negative electrodes in large quantities, any excessive variation in circumference is provided for by the additional take-up afforded by spacer 7 and nut 7A operating as shown in Fig. 9.

In the modification shown in Fig. 14, the assembly is made with the minimum number of parts, porcelain block 22 differing from that of Fig. 5 in being provided with a recess 23 which is adapted to receive the lower end of bolt 24, which bolt is slotted at its upper end at 25 to afford a means for turning the bolt. Nut 26 is positioned on the bolt 24 between the block 22 and the band 14 and by turning the bolt in such a way as to raise the nut, the band 14 is pulled tight and the negative electrode is held firmly against the block. As is shown in Fig. 15, a metallic shoe 27, shown in detail in Fig. 16, may be used to give a bearing for the lower end of the bolt 24 when block 9 (Fig. 5) or block 19 (Fig. 13) is used in place of block 22 (Fig. 14).

Another means for holding the negative electrode firmly against the insulating block is that shown in Fig. 17. The negative electrode 13 is held by annular band 14ᶜ, provided with diametrically disposed perforations, through one of which is passed bolt 4 and through the other of which is passed bolt 28, provided with nut 29. The head of the bolt 4 is positioned in the recess 18 of block 9 (see Fig. 5) and the band 14ᶜ is pulled tight by adjusting the nut 29 on bolt 28.

In any of the previous forms shown, the flat band 14 may be replaced by the annular band 14ᶜ, shown in Fig. 16, and vice versa, suitable perforations being made to accommodate the particular assemblage in which it is to be used.

What we claim is:—

1. In an electric cell, a disk-like electrode and means for suspending the same, said means comprising a flexible band encircling the disk-like electrode peripherally, means connected to the band arranged to exert a pull thereon radially with respect to said disk-like electrode, and means arranged to exert pressure on the disk-like electrode and cooperating with means exerting the pull to tighten the band around said disk-like electrode.

2. In an electric cell, a disk-like electrode and means for suspending the same, said means comprising a flexible band encircling the electrode peripherally, means for exerting a pull on the band radially with respect to the electrode and means associated with the said pulling means for exerting a pressure on the electrode in an opposite direction, whereby the band is tightened around the electrode.

3. In a primary cell having depending positive and negative elements, said negative element being of round cross-section, a block of insulating material, a bolt-like element carrying the block, a flexible clasping band adapted to encircle the negative element and tightening means comprising a nut on said bolt-like element for clamping said band against said block and around said negative element.

4. In an electric cell, a disk-like electrode and means for suspending the same, said means comprising a flexible band encircling the disk-like electrode peripherally, a bolt connected to the band arranged to exert a pull thereon radially with respect to the disk-like electrode, means arranged to exert pressure on the disk-like electrode, and a nut on said bolt arranged to move said pressure exerting means whereby it cooperates with the bolt to tighten the band around said disk-like electrode.

5. In a electric cell, a disk-like electrode and means for suspending the same, said means comprising a flexible band encircling the disk-like electrode peripherally, means connected to the band arranged to exert a pull thereon radially with respect to said disk-like electrode, an insulating member arranged to exert pressure on the disk-like electrode and means on the said pulling means arranged to force the said insulating member in an opposite direction to the pull of said pulling means to tighten the band around said disk-like electrode.

6. In an electric cell, a disk-like electrode and means for suspending the same, said means comprising a flexible band encircling the disk-like electrode peripherally, a bolt having means thereon arranged to exert a pull radially with respect to the disk-like electrode, an insulating block between the end of said block and said disk-like element and seated on said disk-like element engaged on its upper face by said bolt and means associated with the said bolt for exerting pressure on said block in an opposite direction to the pull of the means on said bolt.

7. In an electric cell, a disk-like electrode and means for suspending the same, said means comprising a flexible band encircling the disk-like electrode peripherally, means arranged to exert a pull thereon radially with respect to the electrode, means arranged to exert a pressure on the disk-like electrode, whereby the band is tightened around the electrode, and additional means straddling the pressure exerting means engaging the said band and resisting the pull exerted thereon by the said pulling means.

8. In an electric cell, a disk-like electrode and means for suspending the same, said means comprising a flexible band encircling the disk-like electrode peripherally, means for exerting a pull on said band, means for exerting a pressure in opposite direction on said electrode and means straddling the said pressure exerting means engaging the band and resisting the pull thereon by the said pulling means, the said straddling means being provided with a member arranged to exert pressure on the pressure means and means on the pulling means operably connected thereto to force the said straddling means downwardly against the said pressure exerting means.

9. In an electric cell, a disk-like electrode and means for suspending the same, said means comprising a flexible band encircling the disk-like electrode peripherally, a bolt engaging said band, an insulator block between said bolt and electrode whereby the band is held over said block by said bolt, a yoke straddling said block and having portions engaging said band, said yoke being carried by said bolt, and a nut on said bolt engaging said yoke, whereby when the said nut is moved downwardly on said bolt it forces said yoke downwardly and causes tightening of the band around said electrode.

10. An electric cell comprising a container for an electrolyte, a top for said container, a negative electrode, a flexible band for supporting the same, an insulator block seated on said electrode and carrying positive elements at either side in proximity to said negative electrode, a bolt arranged to bear upon said block and carrying the band, a spacing element extending upwardly and engaging the under side of the top of said container, a clamping yoke extending downwardly and straddling said block and engaging the said band, and a nut on said bolt arranged to tighten said yoke in straddling position against said band to force the band tightly around said electrode.

11. In an electric cell, a container and a top therefor, means for suspending the positive and negative elements from the top, said means comprising an insulating block having means for suspending positive plates at either end and being provided at its base with a seat for reception of a portion of the negative element, a negative element of substantially disk-like form having a portion seated in the seat of said block, a flexible band encircling the said negative element peripherally, a bolt-like element secured to the top engaging the said band and arranged to exert a pull thereon and means operable with respect to said bolt-like element for exerting a pressure on said block and causing it to firmly engage the said negative electrode.

12. In an electric cell, a container and top therefor, means for suspending the positive and negative elements from the top, said means comprising an insulating block having means for suspending positive plates at either end and being provided at its base with a seat for reception of a portion of the negative element, and being provided with recesses at the front and back for reception of a supporting band, a negative element of substantially disk-like form having a portion seated in the seat of said block, a flexible band encircling the said negative element peripherally and confined in part of the recesses of said block, a bolt-like element secured to the top engaging the said band and arranged to exert a pull thereon and means operable with respect to said bolt-like element for exerting a pressure on said block and causing it to firmly engage the said negative electrode.

13. In an electric cell, means for suspending the positive and negative elements therein, said means comprising an insulating block having means for suspending the positive plates at either end and being provided at its base with a seat for reception of a portion of the negative element, a negative element of substantially disk-like form having a portion seated in the seat of said block, a flexible band encircling the said negative element peripherally, a bolt-like element engaging the said band and arranged to exert a pull thereon and a yoke-like member on said bolt and engaging said block, and means on the bolt for causing said yoke-like member to exert a pressure on the block and for causing the bolt to exert a pull on the band.

In witness whereof we have hereunto signed our names at Waterbury, Connecticut, this 21st day of May, 1923.

MARTIN L. MARTUS.
JAMES G. ROSS.
EDMUND H. BECKER.